United States Patent [19]
Yan et al.

[11] Patent Number: 5,948,481
[45] Date of Patent: Sep. 7, 1999

[54] PROCESS FOR MAKING A OPTICAL TRANSPARENCY HAVING A DIFFUSE ANTIREFLECTION COATING

[75] Inventors: Yongan Yan, Thousand Oaks; Din-Guo Chen; Yoshitake Sato, both of Agoura, all of Calif.

[73] Assignee: Yazaki Corporation, Tokyo, Japan

[21] Appl. No.: 08/747,590

[22] Filed: Nov. 12, 1996

[51] Int. Cl.$^6$ ............................................. B05D 1/38
[52] U.S. Cl. ...................... 427/419.3; 427/164; 427/402; 427/379; 427/397.7; 427/430.1; 428/330; 428/331; 428/446; 428/448; 428/688; 428/402; 106/287.16; 106/287.19
[58] Field of Search ..................... 427/402, 164, 427/163.4, 397.7, 419.2, 419.3, 430.1, 379; 428/323, 329, 330, 331, 332, 338, 446, 448, 402; 359/586, 601, 580; 106/287.1, 287.16, 287.19

[56] References Cited

U.S. PATENT DOCUMENTS

| | | | |
|---|---|---|---|
| 3,984,581 | 10/1976 | Dobler et al. | 427/35 |
| 4,361,598 | 11/1982 | Yoldas | 427/74 |
| 4,409,285 | 10/1983 | Swerdlow | 428/332 |
| 4,816,333 | 3/1989 | Lange et al. | 428/331 |
| 4,945,282 | 7/1990 | Kawamura et al. | |
| 5,215,839 | 6/1993 | Yu | 430/58 |
| 5,450,238 | 9/1995 | Bjornard et al. | 359/580 |

*Primary Examiner*—Marion McCamish
*Assistant Examiner*—Cheryl Juska
*Attorney, Agent, or Firm*—Sheppard, Mullin, Richter & Hampton; James R. Brueggemann

[57] ABSTRACT

A coated transparency, and method for making it, is disclosed, the transparency having a multi-layer antireflection coating that provides high transmittance with low specular reflectance, yet that also provides reduced visibility of surface defects. The coating includes alternating layers of polymerized silicon dioxide and polymerized titanium dioxide on a transparent substrate, with at least one of the layers incorporating discrete particles having a refractive index different from that of surrounding polymer. This provides the coating with a diffuse reflectance that is comparable to, or larger than, its specular reflectance, yet that still is negligible when compared to the coating's transmittance. The diffuse reflectance creates a loss of contrast for any reflected image or glare, thus masking any surface defects and providing a comfortable visual appearance. The successive layers of the antireflection coating are deposited on the substrate by applying separate solutions of an alkoxide, an alcohol, and water, and by curing the layer at an elevated temperature before the next succeeding layer is applied.

24 Claims, 3 Drawing Sheets

PROCESS FOR MAKING A OPTICAL TRANSPARENCY HAVING A DIFFUSE ANTIREFLECTION COATING

BACKGROUND OF THE INVENTION

This invention relates generally to optical transparencies and, more particularly, to optical transparencies that incorporate antireflection or antiglare coatings on substrates.

Optical transparencies of this particular kind have been developed to provide reduced reflectance and glare and thereby to enhance the readability of information displayed on or through them. It is known that antireflection coatings of low refractive index, as well as antireflection coatings of porous materials, can reduce the specular reflectance of the underlying substrates. However, such coatings can be readily applied only to limited kinds of substrates, and they frequently exhibit relatively poor mechanical properties.

Many commercial antireflection and antiglare coatings also have the disadvantage of sharply limiting the intensity and clarity of transmitted light. Some of these coatings are even highly translucent. In addition, because some of these coatings have significant surface roughness, they often are accompanied by visible defects.

Some antireflection coatings include multiple layers of alternating high refractive index and low refractive index materials. Although these coatings generally exhibit low reflectivity without sacrificing high transmittance and clarity, they can be relatively expensive to produce. In addition, even though such coatings provide relatively low specular reflectance, surface defects frequently are considered to be unduly visible. This has detracted from the suitability of the coated substrates for use as display cover panels.

It should, therefore, be apparent that there is a need for an improved antireflection coating for a transparent substrate, and a method for making it, which provides high transmittance with low specular reflectance, yet which also provides sufficient diffuse reflectance to result in low visibility of surface defects. The antireflection coating also needs to be chemically, mechanically and environmentally stable. The present invention fulfills this need.

SUMMARY OF THE INVENTION

The present invention is embodied in a coated transparency, and a method for making it, which provides high transmittance with low specular reflectance, yet which also provides diffuse reflectance and reduced visibility of surface defects. This is achieved by providing a coating that exhibits diffuse reflectance that is comparable to, or larger than, its specular reflectance, yet that still is negligible when compared to its transmittance. Such diffuse reflectance provides a loss of contrast for any reflected image or glare, thus masking any surface defects and providing a comfortable visual appearance. The coating also is chemically, mechanically and environmentally stable.

More particularly, the coated transparency of the invention includes a transparent substrate and an antireflection coating deposited on a surface of the substrate. The antireflection coating includes a plurality of polymerized layers of prescribed uniform thickness, the layers alternating between polymerized titanium dioxide and polymerized silicon dioxide. At least one layer of the coating incorporates discrete particles having a concentration in the range of 0.00015 to 0.0006 milligrams per square centimeter, and the particles have a refractive index different from that of the remainder of the layer. The layers cooperate to provide a diffuse antireflection coating at visible wavelengths, which masks any surface defects and provides a comfortable visual appearance. Specular reflection preferably is limited to less than about 4%, while diffuse reflection preferably is limited to a comparable value, in the range of 0.2 to 5%.

In a more detailed feature of the invention, the discrete particles incorporated into the antireflection coating are selected from the group consisting of silicon dioxide, aluminum oxide, magnesium fluoride, titanium dioxide, and mixtures thereof. The particles have sizes of less than about 10 microns, and they are agglomerations of smaller, subparticles. When the discrete particles are formed only of silicon dioxide, they have a concentration of less than about 0.1% by weight. On the other hand, when the discrete particles incorporate aluminum oxide, magnesium fluoride, and/or titanium dioxide, they have a concentration of less than about 10% by weight.

In another more detailed feature of the invention, the discrete particles can be incorporated into any number of layers of the antireflection coating. For example, they can be incorporated into all of the layers, or only into the outermost layer.

The transparent substrate can have any suitable shape, e.g., flat, and it can be formed of any suitable material such as glass or plastic. In the latter case, the plastic material can be selected from the group consisting of polymethyl methacrylate, polycarbonate, polystyrene, allyl diglycol carbonate, and polyethylene.

Other features and advantages of the present invention should become apparent from the following description, taken in conjunction with the accompanying drawings, which disclose, by way example, the principles of the invention.

DESCRIPTION OF THE PREFERRED EMBODIMENTS AND PROCESSES

Figure 1:
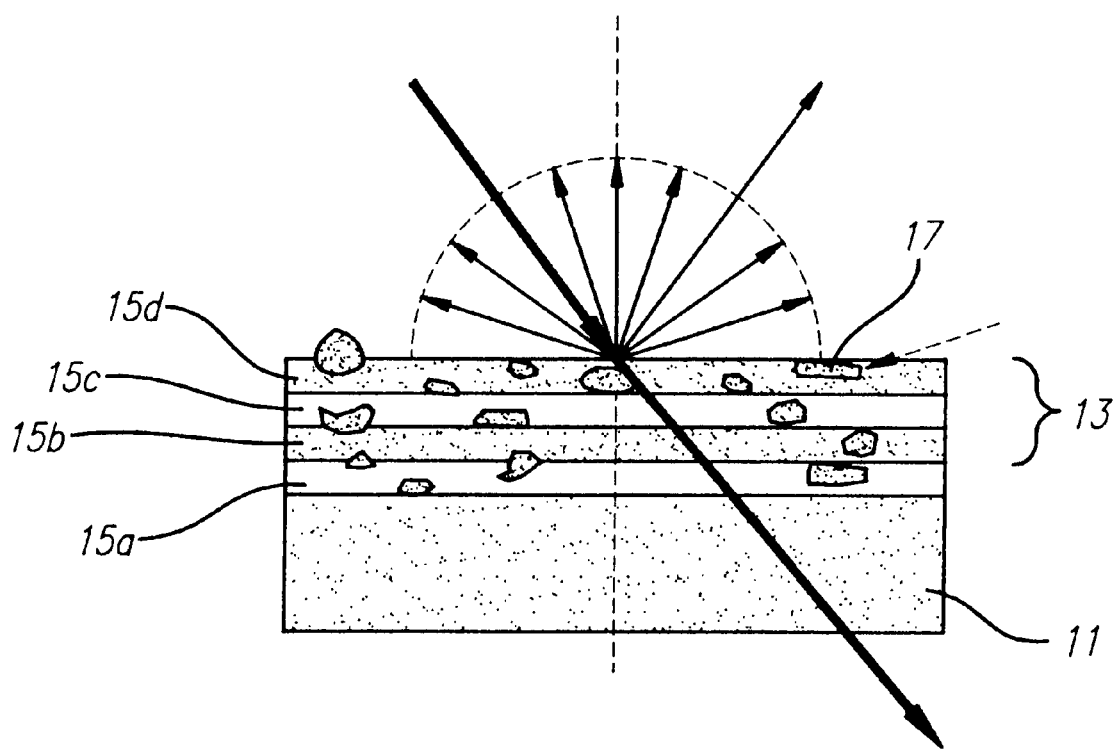
FIG. 1 is a schematic cross-sectional drawing of an embodiment of a coated transparency in accordance with the invention, with ray traces representing the transparency's transmittance and reflectance.

With reference now to the drawings, and particularly to FIG. 1, there is shown a transparent substrate 11 on which is deposited a four-layer antireflection coating 13 that provides high transmittance of visible light with low specular reflectance. The successive layers 15a–15d of the coating have prescribed uniform thicknesses, and they alternate between polymerized silicon dioxide and polymerized titanium dioxide, which are each formed using a sol-gel process. The first layer 15a and third layer 15c are formed of silicon dioxide and have relatively low refractive indices of about 1.44, while the second layer 15b and fourth layer 15d are formed of titanium dioxide and have relatively high refractive indices of about 2.00.

At least one of the layers 15a–15d of the antireflection coating 13 contains discrete particles 17 of a compound selected from a group that includes silicon dioxide ($SiO_2$), titanium dioxide ($TiO_2$), aluminum oxide ($Al_2O_3$), and magnesium fluoride ($MgF_2$). These particles are randomly distributed, and firmly bonded, within the layer(s).

The layers 15a–15d of the antireflection coating 13 are each formed using a sol-gel process in which an alkoxide, an alcohol, an acid catalyst, and water are mixed together to form a solution that is appropriately conditioned so as to gel into the desired silicon dioxide or titanium dioxide polymer matrix. The solutions are successively applied to the transparent substrate 11 using any of several suitable techniques, including dipping, spinning, and roll-coating, after which the deposited material is cured at an elevated temperature before the next succeeding layer is deposited. Suitable processes for applying the coating are described in detail in copending and commonly assigned application for U.S. patent, Ser. No. 08/664,911, filed Jun. 17, 1996, in the names of Din-Guo Chen et al. and entitled "Plastic Articles Having Multi-Layer antireflection coatings, and Sol-Gel Process for Depositing Such Coatings," which is incorporated by reference.

The concentration of the discrete particles 17 in the one or more alkoxide solutions for the antireflection coating 13 is very low. When the particles are formed of silicon dioxide, or silica, their concentration preferably is less than 0.1% by weight. When the particles are formed of titanium dioxide, aluminum oxide, or magnesium fluoride, on the other hand, their concentration preferably is less than 10% by weight. Higher concentrations can impart an unduly high specular reflectance and an unduly high diffuse reflectance to the coating.

The discrete particles 17 are believed to be agglomerations of smaller, sub-particles having sizes in the range of 0.0001 to 10 microns. These sub-particles can be either spherical or irregular in shape. The sub-particles and agglomerated particles all are sufficiently small that they are substantially invisible to the naked human eye, both when in solution and in the coating layer.

The particles added to the one or more alkoxide solutions may be in the form of a solid powder or a colloidal solution. Dispersion of the particles in the solution can be achieved using mechanical stirring or ultrasonication, or alternatively by treating the solution with dispersion agents, e.g., aminopropyltrimethoxysilane, trimethylethoxyl-silane, trimethylmethoxylsilane, dimethyldicholosilane, or 1,6-hexadilazane.

The transparent substrate 11 can be of any shape, e.g., a flat or curved panel, and it can be formed of any suitable material such as glass or plastic. In the latter case, the plastic material can be any material selected from the group consisting of polymethyl methacrylate (PMMA), polycarbonate, polystyrene, allyl diglycol carbonate (CR-39), and polyethylene terephthalate (PET).

After curing (at 84° C., in the case of PMMA, for at least five minutes), the coated substrate 11 made in accordance with the invention exhibits a specular reflectance of less than about 4% in the wavelength range of 400–700 nanometers (nm) and a diffuse reflectance in the range of 0.3–5.0% at 550 nm. This level of diffuse reflectance, in combination with the specified level of specular reflectance, provides a loss of contrast for any reflected image or glare, thus masking any surface defects and providing a comfortable visual appearance. Incorporation of the discrete particles into the antireflection coating 13 also can broaden the wavelength bandwidth of low specular reflectance, as compared with coatings that do not include such particles. The antireflection coating of the invention also is chemically, mechanically and environmentally stable.

The coated transparency, and process for making it, having been generally described, the following particular examples will illustrate various properties of the invention and demonstrate the practical advantages of the invention. These examples should be construed merely as illustrative, and should not limit the remainder of the disclosure or the claims.

EXAMPLE 1

This example produced a four-layer antireflection coating on a polymethyl methacrylate (PMMA) substrate. Adhesive paper was first removed from the PMMA sheet, and the bare sheet was then cleaned in an ultrasonic bath with detergent solutions and thoroughly rinsed with deionized water. The sheet was then dried under a hot air flow, followed by an ionized air flow, to avoid static charge buildup.

Separate coating solutions were prepared for each of the coating's four layers. The solutions for the first and third layers were titanium based, while the solutions for the second and fourth layers were silicon based.

The solution for the first layer was prepared by mixing titanium isopropoxide $Ti(OiPr)_4$, ethyl alcohol (EtOH), deionized water ($H_2O$), and hydrochloric acid (HCl). The general range of the molar composition for this first layer was 1 mole of $Ti(OiPr)_4$: 80–120 of EtOH: 2–5 moles of $H_2O$:0.05–0.5 moles of HCl. The four components in the preferred molar composition were mixed thoroughly at room temperature for four hours, after which the solution was allowed to stand at room temperature for 48 hours. During this time, the solution underwent an hydrolysis reaction and polymerization, to form a titanium dioxide polymer solution. The polymerized solution then was filtered and transferred to a polypropylene storage tank.

The solution for the first layer was transferred to a dip coating chamber, and the PMMA substrate was clamped to a vertically movable arm. The temperature within the chamber was controlled to be 23° C., and the humidity within the chamber was controlled to be in the range of 40 to 80%. The substrate then was lowered into the solution and kept submerged for 10 seconds, after which it was withdrawn at a controlled speed. As the substrate was withdrawn, a clear, uniform layer was obtained.

The substrate coated with the first layer then was transferred to an oven, and the temperature of the oven was raised at a uniform rate from 23° C. to 84° C., over a time period of 5 minutes. This 84° C. temperature was maintained for 5 additional minutes, during which time the first coating layer was fully cured. The oven temperature then was lowered back to 23° C., again at a uniform rate over a period of 5 minutes, and the substrate was removed. The thickness of the cured titanium dioxide first layer was measured in the range of 15 to 30 nm, and the refractive index of the layer was measured to be 2.00 at a wavelength of 550 nm.

The coating solution for the second layer was prepared by mixing tetraethyl orthosilicate (TEOS), ethyl alcohol (EtOH), deionized water ($H_2O$), and hydrochloric acid (HCL). The general range of the molar composition considered to be suitable is 1 mole of TEOS, 70–110 moles of EtOH, 2–6 moles of $H_2O$, and 0.1 to 0.3 moles of HCl. These four components were mixed thoroughly at room temperature for four hours, after which the solution was allowed to stand at room temperature for at least four additional hours. During this time, the solution underwent an hydrolysis reaction and polymerization, to form a silicon dioxide polymer solution. The polymerized solution then was filtered and transferred to a polypropylene storage tank.

The solution for the second layer was transferred to the dip coating chamber, and the PMMA substrate, with the first layer of the four-layer antireflection coating already adhered, was clamped to the vertically movable arm. The temperature within the chamber was controlled to be 23° C., and the humidity within the chamber was controlled to be within the range of 20 to 50%. The substrate then was lowered into the solution and kept submerged for 10 seconds, after which it was withdrawn at a controlled speed. As the substrate was withdrawn, a clear, uniform second layer was obtained on top of the first layer.

The substrate coated with the cured first layer and the newly dipped second layer then was transferred to the curing oven, and the temperature of the oven was raised at a uniform rate from 23° C. to 84° C., over a time period of 5 minutes. This 84° C. temperature was maintained for at least 5 additional minutes, during which time the second coating layer was fully cured. The oven temperature then was lowered back to 23° C., again at a uniform rate over a period of 5 minutes, and the substrate was removed. The thickness of the cured silicon dioxide second layer was measured to be in the range of 20 to 35 nm, and the refractive index of the layer was measured to be 1.44 at a wavelength of 550 nm.

The coating solution for the third layer was prepared in a manner similar to that of the solution for the first layer, except with a somewhat different molar composition. The general range of the molar composition considered to be suitable is 1 mole of $Ti(OiPr)_4$, 35–55 moles of EtOH, 2–5 moles of $H_2O$, and 0.1 to 0.4 moles of HCl. During the dipping stage for the third layer, the temperature and humidity were controlled to be the same as for the dipping stage for the first layer, but the substrate was withdrawn from the solution at a controlled speed. Curing of the third layer occurred in exactly the same way as did curing of the first layer. After curing, the thickness of the third layer was measured to be in the range of 70 to 90 nm, and its refractive index was measured to be 2.00 at a wavelength of 550 nm.

The coating solution for the fourth layer was prepared in a manner similar to that of the solution for the second layer, except that the general range of molar composition considered to be suitable is 1 mole of TEOS, 20–40 moles of EtOH, 2–5 moles of $H_2O$, and 0.05–0.1 moles of HCl. During the dipping stage for the fourth layer, the temperature and humidity were controlled to be the same as for the dipping stage for the second layer, but the substrate was withdrawn from the solution at a controlled speed. Curing of the fourth layer occurred in exactly the same way as did curing of the second layer, except that the coated panel was maintained at the 84° C. temperature for 4 hours. After curing, the thickness of the fourth layer was measured to be in the range of 90 to 110 nm, and its refractive index was measured to be 1.44 at a wavelength of 550 nm.

Figure 2:
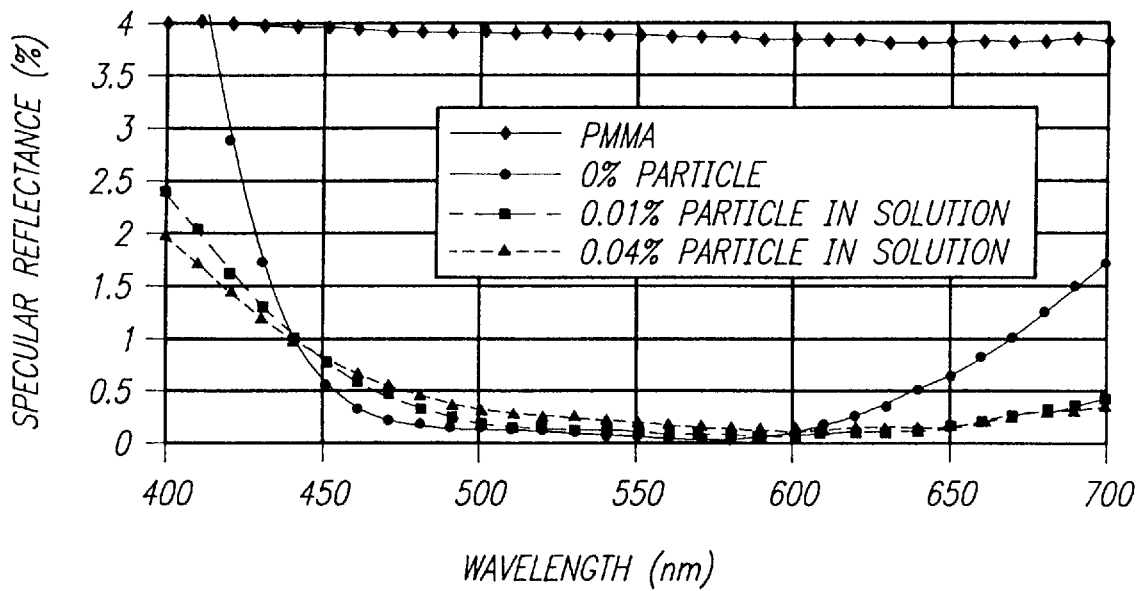
FIG. 2 is a graph depicting the specular reflectance as a function of wavelength for a bare polymethyl methacrylate (PMMA) substrate and for several different coated PMMA substrates.

After the final curing step for the fourth layer of the four-layer antireflection coating of this example, the coating was found to be clear and free of any visible defects. The sample's reflectance was measured using a spectrophotometer (Cary 4, sold by Varian) over a wavelength range of 300 to 800 nm, and data representing the results of this measurement are depicted in FIG. 2. The data show the reflectance to be less than 0.55%, 0.08% and 0.65% at wavelengths of 450 nm, 550 nm and 650 nm, respectively.

The diffuse reflectance of the sample was measured using integrating spheres, a diffuse reflectance accessory. A diffuse reflectance of 0.20% was measured at 550 nm, which is substantially the same as that of the bare PMMA substrate.

The four-layer antireflection coating of this example also was evaluated using a scratch resistance test and a tape adhesion test. The sample showed no visible marks from even a 3H pencil, and it withstood the tape adhesion without damage. However, small optical defects sometimes were visible in the coating.

The four-layer antireflection coating of this example also was evaluated for susceptibility to environmental degradation. These include a high temperature test, a low temperature test, a humidity test, a thermal shock test, and a chemical resistance test. Following each such environmental test, the sample was evaluated for its reflectance, scratch resistance, and tape adhesion resistance. No degradation in the sample's properties were observed following these environmental tests.

EXAMPLE 2

The first three layers of the four-layer antireflection coating were deposited on a PMMA substrate and cured in exactly the same way as was done in Example 1. However, the fourth layer of the coating was prepared differently. Specifically, the fourth layer solution was prepared in a manner similar to the fourth layer solution of Example 1, except that it further included a prescribed quantity of minute silica particles. This solution was placed in an ultrasonic apparatus and exposed to high-frequency sound waves of 42 kHz, at a power level of 1250 watts, for 5 minutes. The surface area of the silica particles in the solution, measured using a nitrogen adsorption method, was found to be 200 square meters per gram, and the average particle size was measured to be 0.012 microns. The silica particles were determined to constitute 0.01% by weight of the final coating solution.

Figure 4:
FIG. 4 is a micrograph (2500x) of the outer surface of a coated transparency embodying the present invention.

The fourth layer of the coating was applied by dipping the three-layer coated substrate in the fourth layer solution, at a temperature and humidity that were controlled to be the same as for the fourth layer described in Example 1. Curing of the fourth layer occurred in exactly the same manner as did the curing of the fourth layer of Example 1. After curing, the thickness of the fourth layer was measured to be in the range of 80–120 nm. As depicted in FIG. 4, fine particles were observed to be distributed substantially randomly in the coating layer when examined under a 2000× scanning electron microscope. These particles were invisible to the naked eye.

Figure 3:
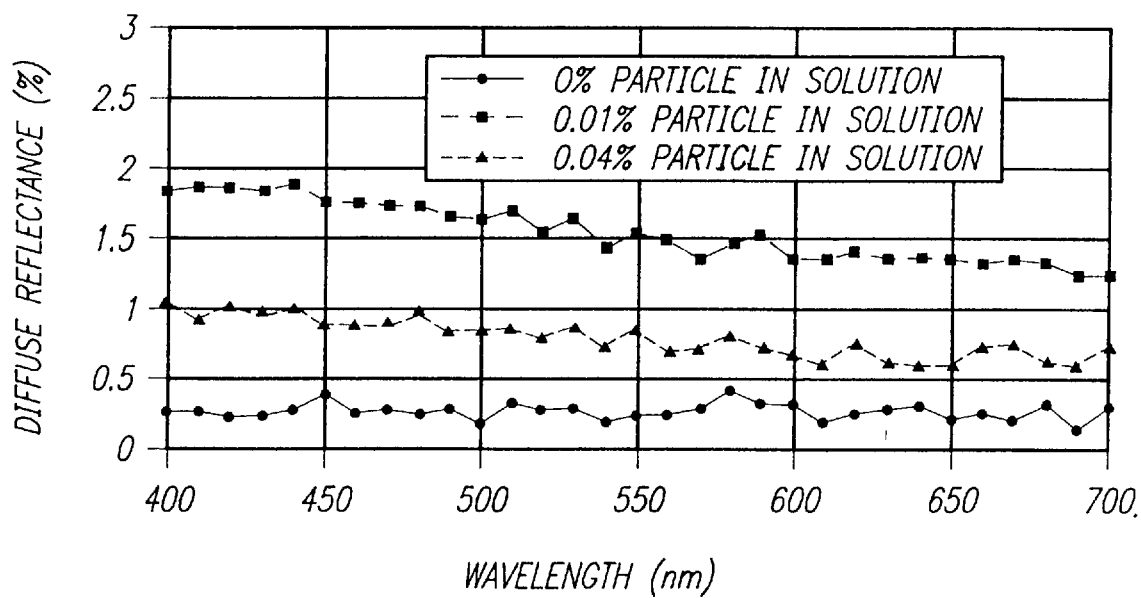
FIG. 3 is a graph depicting the diffuse reflectance as a function of wavelength for several different coated PMMA substrates.

As shown in FIG. 2, the specular reflectance of the coated substrate was measured to be 0.75%, 0.15% and 0.22%, at wavelengths of 450 nm, 550 nm and 650 nm, respectively. In addition, as shown in FIG. 3, the diffuse reflectance of the coated substrate was measured to be 0.85%, at 550 nm.

The coated substrate of Example 2, with a diffuse reflected image, was found to create a comfortable visual appearance. Although the fourth layer solution was not filtered, the coating was found to be free of any visible defects. The sample also was evaluated for its ability to withstand mechanical and environmental tests of the kind described in Example 1. No degradation in the sample's properties were observed following these tests.

EXAMPLE 3

A four-layer antireflection coating was prepared in exactly the same manner as was the sample of Example 2, except that the fourth-layer coating solution was aged at room temperature for 60 days after mixing with the silica particles. The specular reflectance of the coated substrate was determined to be similar to that of the sample of Example 2. The diffuse reflectance and the mechanical and environmental stability, of the sample also were determined to be similar to that of the sample of Example 2. Thus, no degradation occurred in the fourth layer solution or the fourth layer of the coating, even though silica particles were added.

EXAMPLE 4

A four-layer antireflection coating was prepared in exactly the same manner as was the sample of Example 2, except that the amount of silica particles in the fourth layer solution was increased to 0.04% by weight in the final solution. After curing, and as shown in FIG. 2, a very low specular reflectance was observed, and mechanical and environmental stability similar to that of Example 1 was found. As shown in FIG. 3, diffuse reflectance of the sample of Example 4 was found to be 1.53% at 550 nm.

EXAMPLE 5

A four-layer antireflection coating was prepared in exactly the same manner as was the sample of Example 2, except that the amount of silica particles in the fourth layer solution was increased to 0.5% by weight in the final solution. After curing, the sample's specular reflectance was observed to be much higher than that of the sample of Example 2, being about 4% over the entire wavelength range of 450–650 nm. In addition, the sample's diffuse reflection was observed to be about 4.5%. However, the coating also was found to be mechanically weak, and it failed 3H, 2H and 1H pencil scratch tests.

EXAMPLE 6

Four-layer antireflection coatings are prepared in exactly the same manner as was the sample of Example 2, except that titanium dioxide particles are substituted for the silicon dioxide particles. The particle concentrations in the various sample solutions range up to about 10%. After curing, the specular reflectance of the samples is observed to be similar to that of the sample of Example 2. In addition, the diffuse reflection of the samples is observed to be about 0.9% at 550 nm. The samples pass tape adhesion and 3H pencil scratch tests.

EXAMPLE 7

Four-layer antireflection coatings are prepared in exactly the same manner as is the sample of Example 2, except that aluminum oxide ($Al_2O_3$) particles are substituted for the silicon dioxide particles. The particle concentrations in the various sample solutions range up to about 10%. After curing, the specular reflectance of the samples is observed to be similar to that of the sample of Example 2, and the diffuse reflectance of the samples is observed to be about 1.3% at 550 nm. The samples pass the tape adhesion and 3H pencil scratch tests.

EXAMPLE 8

Four-layer antireflection coatings are prepared in exactly the same manner as is the sample of Example 2, except that the silica particles are substituted by 50% colloidal silica (40% silica, by weight) and 50% magnesium fluoride ($MgF_2$). The particle concentrations of the various sample solutions range up to about 10%. After curing, the specular reflectance of the samples is observed to be similar to that of the sample of Example 2, and the diffuse reflectance of the samples is observed to be about 1.0% at 550 nm. The samples pass the tape adhesion and 3H pencil scratch tests.

EXAMPLE 9

Four-layer antireflection coatings are prepared in exactly the same manner as is the sample of Example 2, except that the silica particles are added not to the solution for the fourth layer, but rather to the solutions for the first, second and third layers, both individually and in various combinations. The particle concentrations range up to about 0.1%. After curing, the specular reflectance of the samples is observed to be similar to that of the sample of Example 2, and the diffuse reflectance of the samples, likewise, is observed to be similar to that of the sample of Example 2. The samples also pass the tape adhesion and 3H pencil scratch tests.

It should be appreciated from the foregoing description that the present invention provides an improved transparency, and a method for making it, which provides high transmittance with low specular reflectance, yet which also provides reduced visibility of surface defects. This is achieved by providing a coating that exhibits diffuse reflectance that is comparable to, or larger than, its specular reflectance, yet that still is negligible when compared to its transmittance. The diffuse reflection is provided by incorporating discrete particles, in a prescribed concentration, into one or more layers of the transparency's antireflection coating.

Although the invention has been described in detail with reference only to the preferred embodiments and processes, those of ordinary skill in the art will appreciate that various modifications can be made without departing from the invention. Accordingly, the invention is defined only with reference to the following claims.

We claim:

1. A process for depositing a multi-layer antireflection coating on a transparent substrate, comprising:

mixing together an alkoxide, an alcohol, and water to produce a plurality of polymerized solutions formulated to provide transparent thin-film layers having different refractive indices;

repeatedly applying a separate polymerized solution to the transparent substrate, wherein an amount of the solution adheres to the substrate following each application; and immediately following each application of a separate polymerized solution, curing the adhered solution, to form a separate, polymerized thin-film layer on the substrate;

wherein repeatedly applying and then curing produces a succession of overlaying thin-film layers, with refractive indices of the successive layers being alternately high and low relative to each other;

wherein the alkoxide solutions that are used to produce thin-film layers having relatively high refractive indices include titanium isopropoxide, and the layers produced using such solutions include polymerized titanium dioxide;

wherein the alkoxide solutions that are used to produce thin-film layers having relatively low refractive indices include tetraethyl orthosilicate, and the layers produced using such solutions include polymerized silicon dioxide;

wherein at least one of the polymerized solutions produced in mixing further includes discrete particles having a concentration in the solution of less than 0.1% by weight and an average size of less than about 10 microns;

and wherein the successive polymerized layers cooperate to form a multi-layer, diffuse antireflection coating.

2. A process as defined in claim 1, wherein the discrete particles incorporated into one or more of the solutions produced in mixing is silicon dioxide.

3. A process as defined in claim 1, wherein mixing the one or more solutions containing the discrete particles includes mixing ultrasonically.

4. A process as defined in claim 1, wherein only one of the solutions produced in mixing incorporates the discrete particles, and such solution is applied to the substrate to form the outermost thin-film layer.

5. A process as defined in claim 1, wherein the discrete particles included in at least one of the polymerized solutions produced in the step of mixing have a refractive index that is substantially different from that of the remainder of the material that will comprise the polymerized layer to be formed using the solution.

6. A process as defined in claim 1, wherein:

the discrete particles are included in the polymerized solution that is applied to the substrate to form the outermost thin-film layer; and the outermost thin-film layer has an outer surface, with at least some of the discrete particles projecting above the surface.

7. A process as defined in claim 1, wherein:

each step of repeatedly applying a polymerized solution to produce a layer that includes polymerized titanium dioxide occurs within a chamber in which the humidity is in the range of 40% to 80%; and each step of repeatedly applying a polymerized solution to produce a layer that includes polymerized silicon dioxide occurs within a chamber in which the humidity is in the range of 20% to 50%.

8. A process for depositing a multi-layer antireflection coating on a transparent plastic substrate, comprising:

mixing together titanium ispropoxide, an alcohol, water, and an acid catalyst, to produce one or more titanium-containing, polymerized solutions, each formulated to provide a transparent thin-film coating layer having a first specified refractive index;

mixing together tetraethyl orthosilicate, an alcohol, water, and an acid catalyst, to produce one or more silicon-containing, polymerized solutions, each formulated to provide a transparent thin-film coating layer having a second specified refractive index;

alternately applying a titanium-containing solution and a silicon-containing solution to the transparent plastic substrate, wherein an amount of the solution adheres to the substrate following each application; and immediately following each application of a titanium-containing solution or a silicon-containing solution, curing the adhered solution at an elevated temperature, to form a separate, polymerized thin-film layer on the substrate;

wherein the steps of alternately applying and curing produce a succession of overlaying thin-film layers having refractive indices that are alternately high and low relative to each other;

wherein the polymerized solution produced in the step of mixing that is used in the last step of applying, to form the outermost layer of the succession of overlaying thin-film layers, further includes discrete particles of silicon dioxide having an average size of less than about 10 microns, with a weight concentration in the solution of less than 0.1%;

and wherein the succession of overlaying thin-film layers cooperate to form a multi-layer, diffuse antireflection coating on the plastic substrate.

9. A process as defined in claim 8, wherein the discrete particles included in the polymerized solution used in the last step of applying, to form the outermost layer of the succession of overlaying thin-film layers, have a refractive index that is substantially different from that of the remainder of the outermost layer.

10. A process as defined in claim 8, wherein the outermost layer of the succession of overlaying thin-film layers has an outer surface, with at least some of the discrete particles projecting above the surface.

11. A process as defined in claim 8, wherein:

each step of applying a polymerized solution to produce a layer that includes polymerized titanium dioxide occurs within a chamber in which the humidity is in the range of 40% to 80%; and each step of applying a polymerized solution to produce a layer that includes polymerized silicon dioxide occurs within a chamber in which the humidity is in the range of 20% to 50%.

12. A process as defined in claim 8, wherein:

the plastic substrate is formed of polymethyl methacrylate; and the successive steps of curing occur at a temperature of about 84° C.

13. A process for depositing a multi-layer antireflection coating on a transparent substrate, comprising:

mixing together an alkoxide, an alcohol, and water to produce a plurality of polymerized solutions formulated to provide transparent thin-film layers having different refractive indices;

repeatedly applying a separate polymerized solution to the transparent substrate, wherein an amount of the solution adheres to the substrate following each application; and immediately following each application of a separate polymerized solution, curing the adhered solution, to form a separate, polymerized thin-film layer on the substrate;

wherein repeatedly applying and then curing produces a succession of overlaying thin-film layers, with refractive indices of the successive layers being alternately high and low relative to each other;

wherein the alkoxide solutions that are used to produce thin-film layers having relatively high refractive indices include titanium isopropoxide, and the layers produced using such solutions include polymerized titanium dioxide;

wherein the alkoxide solutions that are used to produce thin-film layers having relatively low refractive indices include tetraethyl orthosilicate, and the layers produced using such solutions include polymerized silicon dioxide;

wherein at least one of the polymerized solutions produced in mixing further includes discrete particles selected from the group consisting of magnesium fluoride, titanium dioxide, and mixtures thereof, and the discrete particles have a concentration in the solution of less than about 10% and an average size of less than about 10 microns;

and wherein the successive polymerized layers cooperate to form a multi-layer, diffuse antireflection coating.

14. A process as defined in claim 13, wherein the discrete particles incorporated into one or more thin-film layers are distributed substantially randomly across the layer, with a density of less than about 0.1 milligrams per square centimeter.

15. A process as defined in claim 13, wherein mixing the one or more solutions containing the discrete particles includes mixing ultrasonically.

16. A process as defined in claim 13, wherein only one of the solutions produced in mixing incorporates the discrete particles, and such solution is applied to the substrate to form the outermost thin-film layer.

17. A process as defined in claim 13, wherein the discrete particles included in at least one of the polymerized solutions produced in the step of mixing have a refractive index that is substantially different from that of the remainder of the material that will comprise the polymerized layer to be formed using the solution.

18. A process as defined in claim 13, wherein:

the discrete particles are included in the polymerized solution that is applied to the substrate to form the outermost thin-film layer; and the outermost thin-film layer has an outer surface, with at least some of the discrete particles projecting above the surface.

19. A process as defined in claim 13, wherein:

each step of repeatedly applying a polymerized solution to produce a layer that includes polymerized titanium dioxide occurs within a chamber in which the humidity is in the range of 40% to 80%; and each step of repeatedly applying a polymerized solution to produce a layer that includes polymerized silicon dioxide occurs within a chamber in which the humidity is in the range of 20% to 50%.

20. A process for depositing a multi-layer antireflection coating on a transparent plastic substrate, comprising:

mixing together titanium isopropoxide, an alcohol, water, and an acid catalyst, to produce one or more titanium-containing, polymerized solutions, each formulated to provide a transparent thin-film coating layer having a first specified refractive index;

mixing together tetraethyl orthosilicate, an alcohol, water, and an acid catalyst, to produce one or more silicon-containing, polymerized solutions, each formulated to provide a transparent thin-film coating layer having a second specified refractive index;

alternately applying a titanium-containing solution and a silicon-containing solution to the transparent plastic substrate, wherein an amount of the solution adheres to the substrate following each application; and immediately following each application of a titanium-containing solution or a silicon-containing solution, curing the adhered solution at an elevated temperature, to form a separate, polymerized thin-film layer on the substrate;

wherein the steps of alternately applying and curing produce a succession of overlaying thin-film layers having refractive indices that are alternately high and low relative to each other;

wherein the polymerized solution produced in the step of mixing that is used in the last step of applying, to form the outermost layer of the succession of overlaying thin-film layers, further includes discrete particles of a material selected from the group consisting of magnesium fluoride, titanium dioxide, and mixtures thereof, the particles having an average size of less than about 10 microns, with a weight concentration in the solution of less than about 10%;

and wherein the succession of overlaying thin-film layers cooperate to form a multi-layer, diffuse antireflection coating on the plastic substrate.

21. A process as defined in claim 20, wherein the discrete particles included in the polymerized solution used in the last step of applying, to form the outermost layer of the succession of overlaying thin-film layers, have a refractive index that is substantially different from that of the remainder of the outermost layer.

22. A process as defined in claim 20, wherein the outermost layer of the succession of overlaying thin-film layers has an outer surface, with at least some of the discrete particles projecting above the surface.

23. A process as defined in claim 20, wherein:

each step of applying a polymerized solution to produce a layer that includes polymerized titanium dioxide occurs within a chamber in which the humidity is in the range of 40% to 80%; and each step of applying a polymerized solution to produce a layer that includes polymerized silicon dioxide occurs within a chamber in which the humidity is in the range of 20% to 50%.

24. A process as defined in claim 20, wherein:

the plastic substrate is formed of polymethyl methacrylate; and the successive steps of curing occur at a temperature of about 84° C.

* * * * *